United States Patent [19]

McNulty et al.

[11] 3,786,198

[45] Jan. 15, 1974

[54] CIRCUIT AND APPARATUS FOR BRIDGING AND MONITORING

[75] Inventors: Henry V. McNulty, Arcadia; Melvin Neal Oatis, Tustin, both of Calif.

[73] Assignee: Telephonic Equipment Corporation, Santa Ana, Calif.

[22] Filed: Feb. 17, 1972

[21] Appl. No.: 227,023

[52] U.S. Cl. .................. 179/27 FH, 179/95

[51] Int. Cl. .................. H04m 3/22

[58] Field of Search .................. 179/27 FH, 42, 41 R, 179/84 L, 84 C, 95, 94, 91 A, 91 R

[56] References Cited

UNITED STATES PATENTS

| | | | |
|---|---|---|---|
| 3,397,288 | 8/1968 | Semon | 179/42 |
| 3,406,261 | 10/1968 | Shaw | 179/42 |
| 3,406,262 | 10/1968 | Grandstaff | 179/27 FH X |
| 3,542,969 | 11/1970 | Fields | 179/42 |
| 3,532,832 | 10/1970 | Hestad et al. | 179/84 C |
| 2,438,515 | 3/1948 | Mohler | 179/95 |

*Primary Examiner*—Thomas W. Brown

[57] ABSTRACT

A telephone bridging apparatus which can be utilized with telephone switchboards such as those provided by an answering service. The apparatus in part comprises an insertable module in the switchboard, having internal connections and appropriate switching functions for either a single or a double cord switchboard. The module has circuitry which operates cooperatively with a monitoring circuit and the remainder of the apparatus for utilization with either a double or single cord switchboard and comprises in part an audio alert as well as a visual alert to help monitor a call.

5 Claims, 6 Drawing Figures

CIRCUIT AND APPARATUS FOR BRIDGING AND MONITORING

BACKGROUND OF THE INVENTION

1. Field of the Invention

The field of this invention is within the telephone switchboard art.

2. The Prior Art

Prior art telephone switchboards, as related to double cord and single cord switchboards are utilized for various purposes. Some of these purposes are for organizations which have telephonic equipment located throughout the premises which is connected by a central switchboard operator. In other cases, switchboards have been used for substantially enhancing the answering capability of an organization when either all the lines of that organization are busy, or the personnel of the organization are not present at the location. In such cases, where the call is answered at a remote location, it is common to refer to the lines coming into the switchboard as secretarial lines. The lines are respectively tantamount to those of the organization for which the answering service is functioning.

Regardless of whether the organization is one which is provided with an answering service, or has a central switchboard, it is often desirable to receive a call and bridge the call to another number at a remote location. In other words, in the eventuality a doctor, professional person, or other individual needs to be reached, and is not at the number at which the incoming call is received, the call can be sent to another location by a bridge. Specifically, the incoming call on a secretarial line or other incoming line is held for a brief period while the operator of the switchboard or answering service calls the party to be reached at the remote location. Upon approval of the party at the remote location, the operator then bridges the incoming call to the party at the remote location.

The foregoing bridging technique is applicable to businesses with branch offices where certain conference calls must be made. Furthermore, bridging finds great application in conferences with attorneys, building contractors, doctors, and other mobile personnel. An additional utilization of bridging is for after hour calls. The calls can be switched and bridged through a central switchboard of a security department or a plant switchboard to a remote executive or other personnel desiring to receive such calls. Bridging can also be utilized to access WATS or tie lines and further enhance the use of mobile phones.

It has been customary in the past when a bridged call has been required, to bridge the call with various haphazard methods. It has been customary to leave the switchboard cords in the position in which they have been placed and utilize a double plug cord for bridging a call. In this manner, four jacks of the switchboard are tied up, as well as three cords and four plugs. This has created a substantial clogging of switchboards when bridging has been required. In addition to the foregoing drawbacks of bridging in the prior art, there has been no acceptable way of monitoring a bridged call to determine when the parties have terminated the call. Specifically, the operator monitoring a bridged call has oftentimes had to cut in on a periodic basis to ascertain whether or not there is still vocal transmission on the lines between the parties. Such interruption has created an invasion of privacy between the talking parties as well as a hindrance and annoyance to normal verbal expression.

The instant invention overcomes many of the foregoing drawbacks of the prior art by providing apparatus and a circuit which in part comprises a module in a switchboard to convert it into one which has an efficient bridging system. The invention enables a switchboard operator of one or two cord switchboards to receive a call on an incoming line and bridge it. Specifically, after receiving an incoming call, the operator can effectively utilize a central trunk WATS line or tie line to call the party whom the incoming call is meant for. After obtaining the party, the operator can plug a common telephone patching or bridging plug into a jack of the bridging system of this invention and link the parties together. Upon termination of the call by either party, the operator is apprised of such termination by an audio and/or visual signal. The operator can then ascertain termination for herself by switching in her headset. The operator can then disconnect the cords and plugs which have been plugged into the respective jacks for purposes of utilizing the bridging system for further bridged calls.

In essence, the apparatus allows a quick and fascile manner of bridging calls and monitoring them.

SUMMARY OF THE INVENTION

In summation, this invention incorporates apparatus and circuitry for easily bridging calls received through one or two cord switchboards and subsequently monitoring the calls when they have been terminated.

More specifically, calls are received on an incoming line and bridged through a circuit provided in part by a module which can be inserted in the switchboard. The module has a reel and cord for purposes of effectively bridging through single cord switchboards. The module, when fitted for double cord switchboards, is provided with an appropriate jack for the receipt of cord plugs.

The module is combined with an improved monitoring system having solid state circuitry which effectively monitors the termination of a call. The monitoring circuit is combined with an audio alarm and a means for turning on a light within the module for visual observation from the switchboard. All of the foregoing monitoring and bridging functions are accomplished by a substantially superior circuit having operative features in combination with the module substantially improved beyond the state of the art.

BRIEF DESCRIPTION OF THE DRAWINGS

The invention will be more clearly understood by reference to the description, taken in conjunction with the accompanying drawing wherein.

DESCRIPTION OF THE PREFERRED EMBODIMENTS

Single Cord Switchboard Embodiment

In order to more fully explain this invention, a description of a single cord switchboard will be given.

Figures 1, 2:
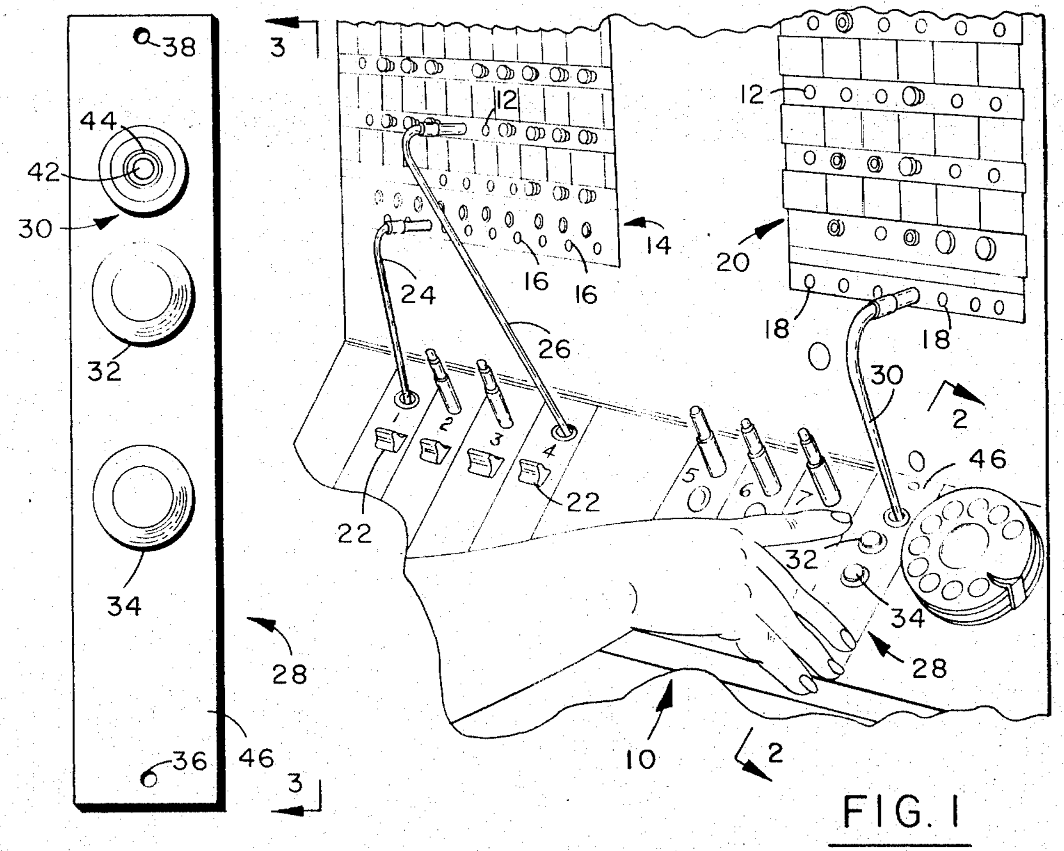
FIG. 1 is a fragmented perspective view of a portion of a switchboard which is commonly designated a single cord switchboard.
FIG. 2 is a plan view of a modular element incorporated within the switchboard along line 2—2 of FIG. 1.

Looking at FIG. 1, a single cord switchboard is shown. The single cord switchboard has a series of secretarial or incoming lines related to respective locations that are to be provided an answering service remotely from where those locations are. The secretarial lines terminate in jacks 12 which are shown on the switchboard toward the upper panel.

The switchboard 10 has a series of dialout lines connected to panel 14 which terminate and correspond to the jakcs 16 on the dialout line panel. The dialout line jacks 16 lead to the central office on a series of respective trunks. A series of intercept or transfer jacks 18 are shown on the intercept jack plate 20 common to the single cords 26 controlled by keys 22.

The switchboard has a series of keys 22 associated with each cord 26. The keys 22 place the operator on a line so that she can listen to it on her headset. The cord 24 is connected to the central office trunk through jacks 16 for dial-out purposes to obtain a party to whom the call is to be bridged. The cords 26 in modules 1 through 7 can be utilized with jacks 12 for answering incoming calls on the secretarial lines.

The system incorporates a telepatcher or bridging cord mount or module 28 which has a cord 30, momentary switch 32, and an on/off switch 34 therein. The cord 30 is utilized with an intercept jack 18 to effectively create a bridged call. The telepatcher cord module 28 interconnects incoming calls to a call which has been dialed on the dialout lines as will be explained.

The telepatcher module 28 can be mounted in a switchboard by means of screws passed through openings 36 and 38 at the top and bottom of the telepatcher module face. The cord 30 has a plug 31 with a tip 42 and ring section 44 which is telephonic terminology for the tip of the plug and the ring of the plug which are of opposite polarities in the electrical system. As previously explained, a momentary switch 32 is provided along with an alternate action switch 34 which pushes on and off. The switches 32 and 34 enable the circuit to function as will be explained.

The bridging module 28 has a face plate 46 which is shown fitted into the switchboard by screws. The face plate 46 helps to secure a module container 48 having a rectangular sheet metal form. The container 48 may be of any suitable configuration or material as long as it serves to effectively mount and hold the circuitry and apparatus of the module. A terminal block 50 is provided and is mounted to the case 48 by means of bolt and nut connections 52, 54, 56 and 58.

Interiorly of the case is a cord reel 60 which is mounted for rotation about an axis 62. The cord reel 60 is spring loaded so that it can be utilized to retract the cord 30 interiorly into the case through a cord guide 64 mounted within the case 48. The cord guide 64 is such that it provides a smooth surfaced gromet 65 interiorly thereof through which the cord 30 may be pulled backwardly into the case 48 or outwardly therefrom.

The switch 32, which can be characterized as a momentary switch, is mounted within the face plate 46 to extend interiorly thereof and is shown with terminal connections and wires leading therefrom. The alternate action push/on, push/off switch 34 has a series of modules 70, 72 and 74 which are provided with terminals 37, 122 and 124 interiorly therein, shown in FIG. 5. The foregoing terminals 37, 122 and 124 operate different portions and functions of the circuit combination with the monitoring circuit as will be explained. Switch 32 has a terminal 76 utilized for the function of operating the monitoring circuit as will be explained.

In lieu of the switch 34, a relay 78 which will operate in a prescribed manner, having analogous terminal points 37, 122 and 124 can be substituted for switch 34. However, the relay 78 must be appropriately connected to the remainder of the invention as will be described with respect to the schematic diagram of FIG. 5.

Turning now more specifically to the terminal block 50 of the module 28, a series of screw type terminals bearing designations 80 through 106 are provided. The terminal designations 80 through 106 correspond to those designations shown in schematic form in FIG. 5.

Figure 4:
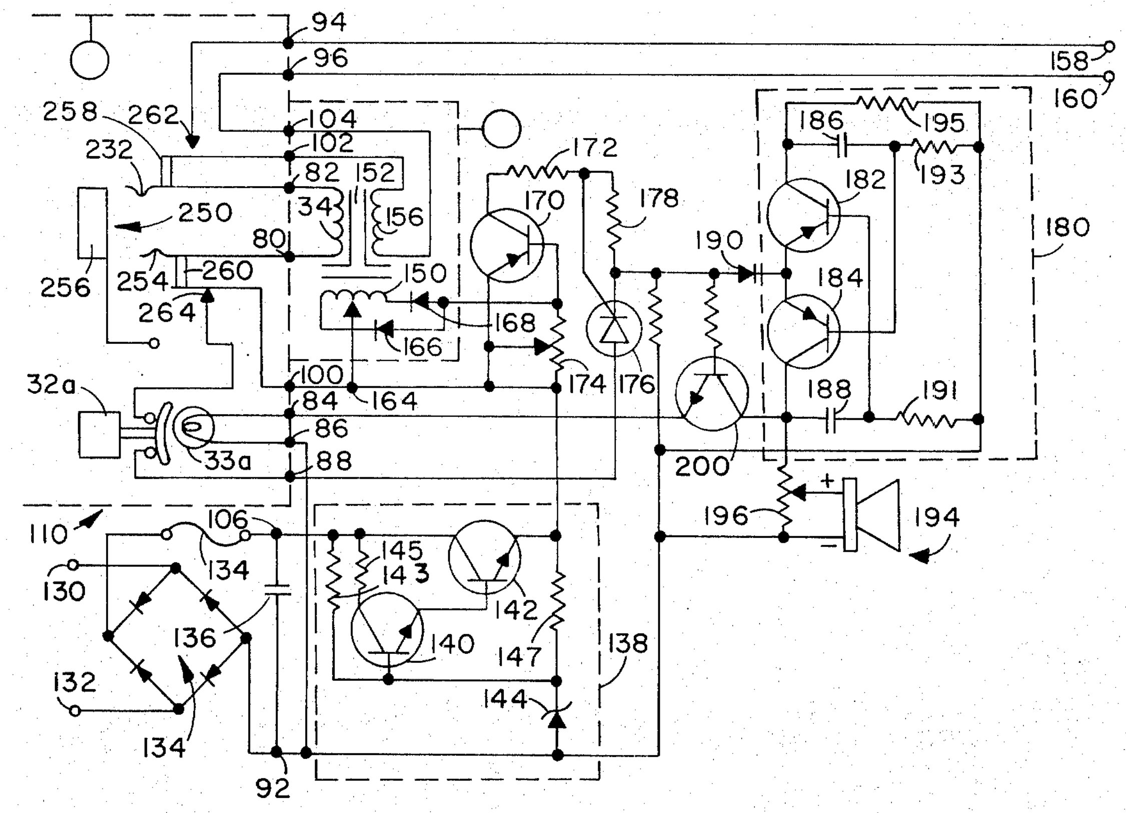
FIG. 4 is a schematic and line diagram of the circuitry of the monitoring system of this system in combination with the circuitry of the modular element incorporated within a two cord switchboard.
Figure 5:
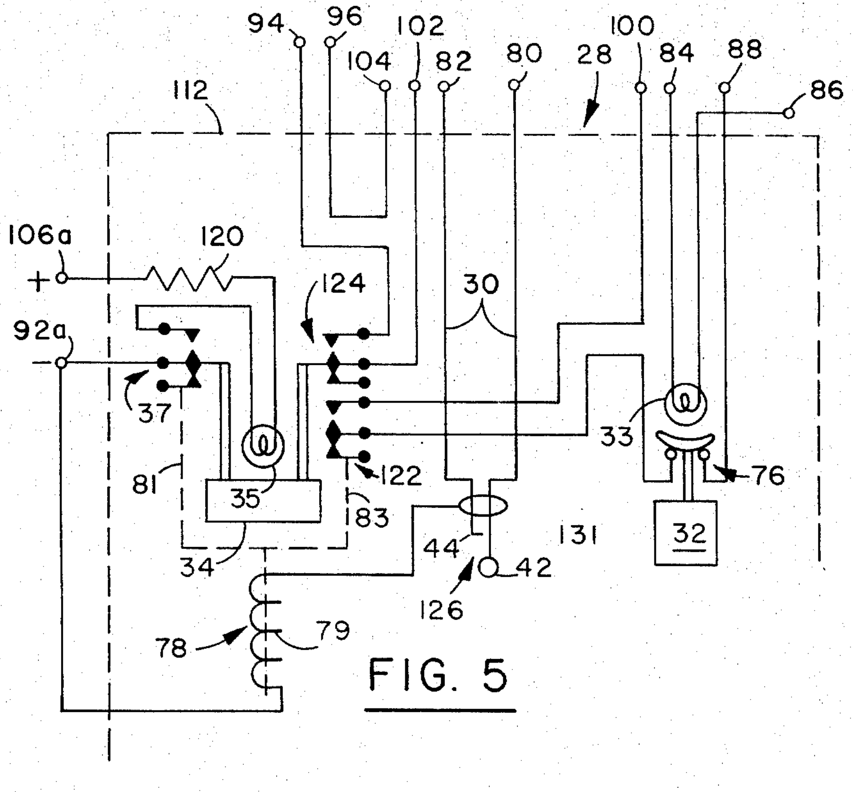
FIG. 5 is a schematic and line diagram of the modular element incorporated with a single cord board for combining with a portion of the monitoring circuitry shown in FIG. 4; and, FIG. 6 is a fragmented alternative embodiment wherein a relay is utilized for a switch of the modular element substantially shown in FIG. 3.

Turning now specifically to FIGS. 4 and 5, a circuit is shown in FIG. 4 having a dotted circuit section 110. The dotted circuit section 110 can be substituted by a dotted circuit section 112 of FIG. 5 at the respective terminal points having like designations. The dotted sections 110 and 112 in FIGS. 4 and 5 are respectively for double cord and single cord switchboards. The remainder of the circuit in FIG. 4 other than the dotted circuit 110 can be utilized with the circuit of FIG. 5.

In order to more fully explain the device with respect to a single cord switchboard the assumption will be made that the dotted circuit configuration 112 has been implaced in lieu of the dotted circuit configuration 110. The circuit 112 is that of the modular unit 28 and is connected at its respective terminal 80 through 106 to the remainder of the circuit shown in FIG. 4. As can be appreciated, this invention finds commonality in its modular form with variously configured switchboards.

Turning more specifically to the circuit configuration 112, in combination with the circuit of FIG. 4, a series of terminals 80 through 106 are shown. The terminals 92*a* and 106*a* are connected to the power supply for the unit which can be approximately 24 volts across terminals 92*a* and 106*a*. Power is supplied across terminals 92 and 106 through a bridge 134 which will be more fully described. Terminal 94 is the tip side of the telephone line coming into the modular unit 28. Terminal 96 is the ring side of the telephone line, which goes in and out of the modular unit 28 and connects to terminal 104. The tip and ring terminals 94 and 96 are of the same polarity as the tip 42 and ring 44 of the cord plug 31. Terminal 102 is the tip side of the line out of the modular element.

Terminal 82 is connected to the ring side 44 of the plug 31 from the line or cord 30. Terminal 80 is connected to the tip side 42 of the plug 31 which is connected to the line or cord 30. Terminal 100 is connected to the positive source of the power supply.

Terminal 84 is a connection for the light 33 as it relates to switch 32 for purposes of indicating when a bridged call has been terminated. Terminal 88 is the power source to the circuitry and of course originates with and is connected across the power supply provided by the bridge 134. Terminal 86 is a neutral point for the modular unit 28 and is connected to the light 33 of switch 32.

As previously stated, the modular unit 28 has switches 32 and 34 that are lit respectively by lights 33 and 35. The light 33 is connected respectively to terminals 86 and 84. Light 35 is connected to a terminal 106*a* which is connected to the power supply and is at the same potential as terminal 106 thereof. The completion of the circuit to light 35 is through the switch contacts 37 which function with the switch 34. A resistor 120 is utilized to protect the filament of the light 35 and acts as a current control means.

The switch 34 opens and closes not only contacts 37, but in addition thereto, contacts 122 and 124. Contacts 122 and 124 complete the circuit for operating the invention as will be explained. When contact 122 is closed by the switch 34, it completes a circuit through terminals 100 and 88. When contact 124 is closed by switch 34, it completes a circuit between terminals 94 and 102. The switch is a push/on, push/off type of switch so that when it is pushed on it maintains closure of the contacts 122, 124 and 37 until pushed off. Thus, when switch 34 is on the light 35 will remain in an illuminated condition, and current will flow through the respective contacts for operation of the invention.

Switch 32 is illuminated as previously stated by light 33. Light 33 is driven by the monitoring circuit when it is in monitoring mode as will be explained. When switch 32 is activated, it momentarily breaks the monitoring circuit.

The plug 31 which is provided in the single cord unit of module 28 is connected to terminals 80 and 82. The plug 31 has a tip 42 and ring 44 which distinguish and connect the respective polarities of the entire circuit.

The power input to the circuit of FIG. 4 is provided by input connections from a telephone company power supply across terminals 130 and 132. A bridge 134 is shown which is effectively a polarity straightener or can be used as a rectifying bridge. Thus, either AC or DC current, without regard to polarity, can be supplied to the circuit of FIG. 4. A fuse designated 134 is placed between the power source and the remainder of the circuit. The power supply taps 92 and 106 to the circuit correspond to the same points at which the power is supplied to terminals 92*a* and 106*a*.

Across the power supply terminals 92 and 106 a capacitor 136 is placed which is for purposes of filtering the current to avoid spikes and transients in the system. In order to regulate the voltage for the circuit, a series regulator 138 is provided which is shown within the dotted configuration designated with a like numeral. The series regulator 138 in this particular version supplies a current having a voltage of approximately 22 volts. As is customary in some series regulators, transistors 140 and 142 are provided with proper biasing and current control resistors 143, 145 and 147, as well as a zener diode 144.

The remainder of the circuit can substantially be described as a detection and monitoring circuit for purposes of indicating to an operator at a switchboard when a bridged call has been terminated. The circuit can also monitor when one of the parties wishes to reach the operator by jiggling his respective hook switch on his telephone instrument. In such a case, when the hook switch is jiggled, the light 33 will illuminate and indicate a signal and an audio signal will also be provided, in the manner to be explained.

The detection circuit has a coil 150 which is on a common core 152 with the voice coils 154 and 156. The voice coils 154 and 156 interconnect with the central office trunk line shown by the tip and ring configuration at terminals 158 and 160 respectively. The core 152 is in magnetically linked relationship with the winding 150 which has been center-tapped at point 164. The winding 150 detects any substantial voltage changes in voice transmission by such things as the closing or momentary jiggling of the hook switch on the telephone receiver. Diodes 166 and 168 are provided in order to insure proper current direction with respect to the remainder of the circuit.

A transistor 170 is utilized for amplifying any voltage spikes which are detected by coil 150 such as the voltage spike which is generated when the receiver hook switch is closed. The transistor 170 amplifies the voltage spike and is protected in part by a current limiting resistor 172. The sensitivity of the transistor for amplification of the voltage spike is controlled by a variable resistance 174 of any suitable configuration.

A silicone controlled rectifier (SCR) 176 is utilized for controlling the remainder of the circuit after detection of a spike or transient has taken place. The SCR 176 is biased so that it develops a sufficient potential with a resistor 178. In order to effectively operate the circuit, so that a visual or audio signal is created, a flip-flop circuit configuration 180 is provided. The flip-flop circuit configuration 180 is generally shown enclosed within dotted lines designated by a like numeral 180. The flip-flop configuration 180 comprises transistors 182 and 184 which function with capacitors 186 and 188. The circuit is provided with resistors 191, 193 and 195 for biasing and controlling current. A diode 190 is utilized in order to have the flip-flop operate in a mode with respect to its proper polarity.

An audio warning device 194 is shown connected across a variable resistor 196 to provide for volume control. The audio warning device 194 is basically an oscillator circuit for creating a tone of sufficient magnitude and proper frequency to warn an operator when a conversation has been terminated or the hook switch has been jiggled. Initiation of the audio warning is created by line spikes registered by coil 150. The audio warning device 194 is controlled by the flip-flop circuit 180 and would normally provide a steady tone but for the fact that the flip-flop 180 cuts the tone off and on. In addition to controlling the audio oscillator 194, the flip-flop controls a transistor 200 appropriately biased to turn the light 33 on and off while at the same time providing an audio signal through the audio warning device 194.

Figures 3, 6:
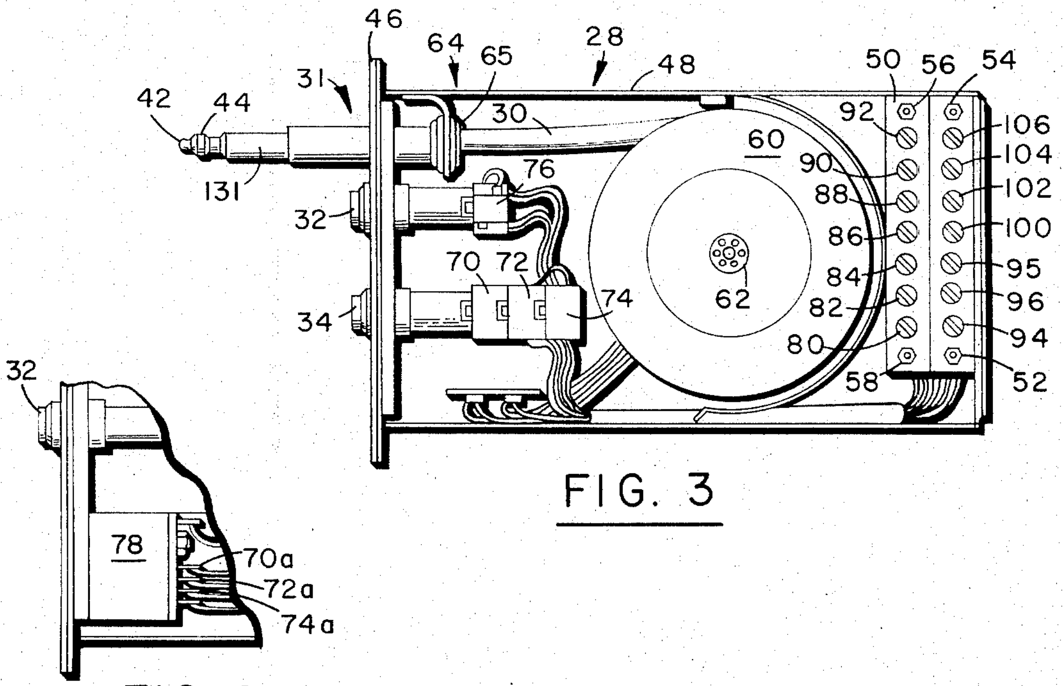
FIG. 3 is a side elevation view of the interior of the modular element looking along line 3—3 of FIG. 2.

FIG. 6 shows an alternative embodiment wherein relay 78 is substituted for the switch 34. The relay 78 has switching terminals analagous to those terminals of the switch 34. Specifically, the terminals of the relay 78 can be analogized to the switch terminals 37, 122 and 124 encased within the switch modules 70, 72 and 74.

When the plug 31 is inserted into a jack 18 the relay 78 connects the respective elements of the circuit of FIG. 4. In other words, the relay controls place the detection circuit elements on line in an analagous manner as when the switch 34 is depressed to close contacts 37, 122 and 124. This puts the circuit in a condition of readiness for detection of line spikes which are generated from the hook switch of one of the bridged parties being closed or jiggled.

The relay 78 has a coil 79 which activates the linkages 81 and 83 to close analagous contacts in the relay 78 to those contacts of the switch 34, namely contacts 122, 124 and 37. The relay coil 79 functions when plug 31 is inserted by virtue of a circuit being completed through the sleeve 131 to ground. The sleeve 131 is common to most telephone plugs and jack connections.

Double Cord Switchboard Embodiment

Looking at the modular unit 28, it can be seen that it can be attached at its terminal block 50 to that portion of the schematic circuit of FIG. 4 outside of the dotted line 110. The modular unit which can be incorporated with a double cord board does not utilize the configuration for implementing the connection as shown in FIGS. 1, 2 and 3. Specifically, the cord reel 60, the cord guide 64, and cord 30 along with its attendant parts are substituted by a jack 250 shown schematically, which incorporates a tip contact 252 and a ring contact 254. The tip and ring contacts 252 and 254 allow for completion of a circuit in conjunction with a grounding sleeve 256.

The jack 250 is insulated with dielectric material 258 and 260. When a plug is inserted within the jack it will mechanically spring apart the contact points 252 and 254. This causes contacts 262 and 264 to be electrically contacted so that a circuit is completed in the same manner as when cord plug 31 is inserted in a jack 18, and switch 34 is closed.

In other words, in the practical embodiment of the modular unit for a double cord board, a cord 30 is not utilized because the cord already exists in a double cord switchboard. As a consequence, the only requirement is to make a connection for which the jack 250 is provided in lieu of the plug 31 and cord 30. Additionally, the modular unit which is utilized for a double cord switchboard connection has a switch 32*a* and light 33*a* similar to switch 32 and light 33. The switch 32*a* is identical in its operation and function as the momentary switch 32, and operates to create contact with the terminal points previously mentioned, namely terminal point 88 and 100, for purposes of operating the detection circuit in a manner that will be described. Thus, a modular unit having the terminal connections 80 through 106 and the schematic circuit 110 in cooperation with the remainder of the circuit of FIG. 4 can be utilized to effectively accommodate the invention to both double cord and single cord switchboards.

Operation of The Single Cord Embodiment

When an incoming call is received on a secretarial line connected to the jack 12, the operator of the switchboard will answer the call and plug cord 26 thereinto. When cord 26 is plugged into the jack 12, the operator can then talk by operating the key 22 related to the particular station designated number 4 on the drawing and utilized with cord 26.

After answering the incoming call and plugging cord 26 into jack 12, the operator ascertains whether the incoming call is to be bridged to a party at a remote number. If the incoming call is to be bridged, the operator will then hold the call for an interim period while dialing out on a dialout line which is connected to the jack 16 and associated with the telepatcher bridging circuit and module 28. The dialout line connected to jack 16 is utilized with any cord related to modules, 1 through 7 not in use. The dialout lines for purposes of bridging are those associated and connected with the bridging circuit of module 28.

Upon receiving the party at the remote location, on the dialout line, the operator will then plug in the cord 30 from the module 28 into the respective intercept jack 18. After plugging in the cord 30 into the intercept jack 18, the operator can then monitor as well as connect the parties by means of pushing the push/on, push/off switch 34. The push/on, push/off switch enables the detection circuit of FIG. 4 to detect when the call is terminated or the hook switch is jiggled. This provides the operator with an audio as well as visual indication thereof by one or the other party hanging up or trying to signal the operator through jiggling the hook switch.

After the foregoing bridged connection has been accomplished, the incoming call on the secretarial line jack 12 is connected with an intercept jack 18 through the module 28 to the trunk that was utilized for dialing out to obtain the remote party. This connects the intercept jack 18 related to the incoming call trunk line to the remote parties' trunk line so that cords 26 and 30 bridge the parties for communication with each other.

As can be seen from FIGS. 4 and 5, the push/on, push/off button, when pushed, closes contacts 37, 122 and 124 connecting cords 26 and 30. Closing of the foregoing contacts also places the circuit in a mode to cause the monitoring circuit to function when the call has been terminated. The same applies to when relay 78 is interposed for switch 34 and its respective contacts close after plugging in plug 31.

When the detecting circuit of FIG. 4 is placed on line by the foregoing closing of switch 34 or relay 78, the coil 150 is poised and ready to receive any line spikes. When a person at either end of the line with respect to the bridged call hangs up or jiggles the hook switch, a transient or voltage spike of a substantial degree is generated. The transient or spike is not of the same magnitude as the regular pulses that are of the amplitude of audio communication on a telephone line. This voltage spike is seen on coil 150. Inasmuch as the coil is center tapped at point 164 and is connected to the diodes 166, 168 at either end, it operates the remainder of the circuit regardless of the polarity of the spike.

When the spike is received, it is amplified by transistor 170 in accordance with the sensitivity thereof as controlled by the variable resistance 174. After amplification, the spike then places the SCR 176 into an on condition by virtue of the threshold voltage being exceeded. The SCR allows the flip-flop 180 to control in an oscillatory manner the blinking of light 33 as well as causing the tone of the audio alarm 194 to be turned on and off. As previously discussed, the audio alarm 194 is connected to a variable resistance 196 which changes the volume thereof.

As can be surmised, the device similarly operates with respect to a double cord embodiment except for the fact that the jack 250 with the sleeve 256 and contacts 252 and 254 eliminates the requirement of a cord 30 in the modular unit 28. However, in most other substantial features of the invention, the operation is analogous.

After the audio and visual presentation is made to the operator by means of light 33 and the audio alert 194, the operator is then apprised that the call has been terminated or the parties are signalling her. The operator first listens to the connected lines to determine if the parties are still talking by operating the associated ky switch 22 to determine whether or not the parties are talking. If the parties are not talking, cords 26 and 30 are disconnected. If the parties are still talking, the operator ascertains their request and then resets the monitoring circuit by pressing the button 32 which is associated with the momentary switch. Upon pressing switch 32 or 32*a*, in double cord switchboards, the momentary switch opens the circuit to preclude further maintenance of threshold voltage to the SCR 176. This ceases flow and causes a return of the circuit to its formerly biased condition prior to receiving the amplified spike.

It should be understood that various embodiments incorporating the heart of this invention, such as the modular unit 28 in various forms and the detection circuit can be modified to fall within the teachings of this invention. Thus, all portions of this invention as to the scope and spirit thereof are only to be read in light of the following claims.

We claim:

1. A telephonic bridging circuit in combination with a single cord switchboard comprising:

a module adapted for connection to said single cord switchboard with respect to one of the central office trunks thereof, having a connecting cord and means for retracting said connecting cord within said module with a plug on said cord at a terminal end thereof for removal and insertion extrinsic to said module;

a detection circuit having an SCR with the gate thereof biased for current flow by a line spike generated when a hook switch of a telephone connected through said module is closed or opened;

means for momentarily breaking the electrical circuit in said detection circuit to cause said SCR to return to a non-current flowing condition;

warning means for providing a warning to an operator when said detection circuit detects the closing of a telephone hook switch of one of the telephones connected through means of said cord;

intercept means for connecting the cord of said module to the trunk of an incoming call;

a terminal block for interfacing said module switchboard, and said detection circuit;

a bipolar bridge connected to said circuit for purposes of supplying power to said module; and, a voltage regulator connected to supply a substantially constant voltage to said detection circuit;

2. The combination as claimed in claim 1 further comprising:

a switching means for connecting an incoming call through said module to the trunk line to which said module is connected and for enabling said detection circuit.

3. The combination as claimed in claim 2 wherein: said switch means is a relay switch activated by the plug of said module being placed across the line of the trunk of said intercept means.

4. The combination as claimed in claim 1 wherein said warning means comprises:

a lamp.

5. The combination of claim 1 wherein said warning means comprises:

an audio warning means having an oscillator circuit for tone generation.

* * * * *